(12) United States Patent
Yoshida et al.

(10) Patent No.: US 11,097,517 B2
(45) Date of Patent: Aug. 24, 2021

(54) LAMINATED GLASS INTERMEDIATE FILM, LAMINATED GLASS AND LAMINATED GLASS INTERMEDIATE FILM PRODUCTION METHOD

(71) Applicant: SEKISUI CHEMICAL CO., LTD., Osaka (JP)

(72) Inventors: Shougo Yoshida, Shiga (JP); Kazuhiko Nakayama, Shiga (JP); Hiroshi Kawate, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 430 days.

(21) Appl. No.: 15/322,787

(22) PCT Filed: Sep. 30, 2015

(86) PCT No.: PCT/JP2015/077703
§ 371 (c)(1),
(2) Date: Dec. 29, 2016

(87) PCT Pub. No.: WO2016/052603
PCT Pub. Date: Apr. 7, 2016

(65) Prior Publication Data
US 2017/0136743 A1     May 18, 2017

(30) Foreign Application Priority Data
Sep. 30, 2014    (JP) .............. JP2014-202341

(51) Int. Cl.
*B32B 17/10*      (2006.01)
*B32B 7/02*      (2019.01)
(Continued)

(52) U.S. Cl.
CPC .......... *B32B 17/10577* (2013.01); *B32B 3/30* (2013.01); *B32B 7/02* (2013.01);
(Continued)

(58) Field of Classification Search
CPC ... B32B 17/10577; B32B 27/08; B32B 27/42; B32B 27/306; B32B 27/30; B32B 27/22;
(Continued)

(56) References Cited

U.S. PATENT DOCUMENTS 4,874,814 A * 10/1989 Cartier .............. B32B 17/10697
525/61
5,319,475 A    6/1994 Kay et al.
(Continued)

FOREIGN PATENT DOCUMENTS

BY           8073       6/2006
CA     2 388 107      5/2001
(Continued)

OTHER PUBLICATIONS

Extended European Search Report dated May 30, 2018 in European Application No. 15847460.1.
(Continued)

*Primary Examiner* — Brian Handville
(74) *Attorney, Agent, or Firm* — Wenderoth, Lind & Ponack, L.L.P.

(57) ABSTRACT

The present invention aims to provide an interlayer film for a laminated glass which has a multilayer structure including two or more resin layers laminated together and can prevent optical distortion even at high temperatures, a laminated glass including the interlayer film for a laminated glass, and a method of producing the interlayer film for a laminated glass. The present invention relates to an interlayer film for a laminated glass, the interlayer film including: two or more resin layers laminated together, one resin layer having a surface with a ratio (Rz/Sm) of a ten-point average roughness Rz (μm) to an average interval Sm (μm) of projections and recesses of 0.0018 or less as measured in conformity with JIS B-0601(1994) in the following manner: a laminated
(Continued)

glass is produced using two clear glass sheets conforming to JIS R3202(1996) and the interlayer film; the interlayer film is peeled away from the clear glass sheets after the laminated glass is cooled with liquid nitrogen; the one resin layer is peeled away from another resin layer that is in direct contact with the one resin layer; and the Rz and Sm of the surface of the one resin layer on the side having been in contact with the other resin layer are measured.

8 Claims, 2 Drawing Sheets

(51) Int. Cl.
*B32B 27/22* (2006.01)
*B32B 3/30* (2006.01)
*B32B 27/30* (2006.01)
*B32B 27/08* (2006.01)
*B32B 27/42* (2006.01)

(52) U.S. Cl.
CPC .. *B32B 17/10036* (2013.01); *B32B 17/10587* (2013.01); *B32B 17/10688* (2013.01); *B32B 17/10761* (2013.01); *B32B 27/08* (2013.01); *B32B 27/22* (2013.01); *B32B 27/30* (2013.01); *B32B 27/306* (2013.01); *B32B 27/42* (2013.01); *B32B 2250/02* (2013.01); *B32B 2250/40* (2013.01); *B32B 2307/102* (2013.01); *B32B 2307/308* (2013.01); *B32B 2307/538* (2013.01); *B32B 2307/732* (2013.01); *B32B 2605/00* (2013.01); *B32B 2605/006* (2013.01)

(58) Field of Classification Search
CPC ............... B32B 3/30; B32B 17/10761; B32B 17/10688; B32B 17/10587; B32B 17/10036; B32B 7/02; B32B 2307/308; B32B 2250/40; B32B 2605/00; B32B 2605/2605; B32B 2605/006; B32B 2307/732; B32B 2307/538; B32B 2307/102; B32B 2250/02
See application file for complete search history.

(56) References Cited

U.S. PATENT DOCUMENTS

| | | | | |
|---|---|---|---|---|
| 5,425,977 A * | 6/1995 | Hopfe | ............... | B29C 59/022 428/141 |
| 5,455,103 A * | 10/1995 | Hoagland | ......... | B32B 17/10577 428/167 |
| 6,077,374 A * | 6/2000 | Hopfe | ............... | B32B 17/10981 156/102 |
| 6,093,471 A | 7/2000 | Hopfe et al. | | |
| 6,649,269 B1 * | 11/2003 | Phillips | ............. | B32B 17/10577 156/308.6 |
| 2001/0046595 A1 * | 11/2001 | Moran | ....................... | C09J 7/22 428/212 |
| 2004/0065229 A1 * | 4/2004 | Papenfuhs | ........ | B32B 17/10761 106/38.2 |
| 2006/0210776 A1 * | 9/2006 | Lu | ........................... | B32B 17/10 428/192 |
| 2006/0210782 A1 * | 9/2006 | Lu | ..................... | B32B 17/10036 428/212 |
| 2008/0254302 A1 | 10/2008 | Bourcier et al. | | |
| 2008/0268204 A1 | 10/2008 | Bourcier et al. | | |
| 2008/0272513 A1 | 11/2008 | Stenzel | | |
| 2008/0280076 A1 * | 11/2008 | Hayes | ..................... | B32B 17/10 428/29 |
| 2010/0177380 A1 * | 7/2010 | Nagahama | ................ | B32B 3/30 359/359 |
| 2011/0151269 A1 | 6/2011 | Hatta et al. | | |
| 2012/0003428 A1 * | 1/2012 | Miyai | ............... | B32B 17/10568 428/156 |
| 2012/0107564 A1 | 5/2012 | Inoue et al. | | |
| 2013/0022824 A1 * | 1/2013 | Meise | ............... | B32B 17/10036 428/441 |
| 2013/0074931 A1 * | 3/2013 | Chen | .................... | C08K 5/1515 136/259 |
| 2016/0271911 A1 | 9/2016 | Kusudou et al. | | |

FOREIGN PATENT DOCUMENTS

| | | |
|---|---|---|
| CN | 1929984 | 3/2007 |
| CN | 1982048 | 6/2007 |
| CN | 102089254 | 6/2011 |
| CN | 102438963 | 5/2012 |
| EP | 3 029 001 | 6/2016 |
| JP | 8-1752 | 1/1996 |
| JP | 10-45438 | 2/1998 |
| JP | 10-508804 | 9/1998 |
| JP | 2007-223883 | 9/2007 |
| JP | 2007-331959 | 12/2007 |
| JP | 2009-155667 | 7/2009 |
| RU | 2 469 863 | 5/2011 |
| RU | 2 469 864 | 6/2011 |
| WO | 96/14985 | 5/1996 |
| WO | 2008/128003 | 10/2008 |
| WO | 2008/134594 | 11/2008 |
| WO | 2015/059830 | 4/2015 |

OTHER PUBLICATIONS

International Search Report dated Dec. 28, 2015 in corresponding International Application No. PCT/JP2015/077703.

* cited by examiner

LAMINATED GLASS INTERMEDIATE FILM, LAMINATED GLASS AND LAMINATED GLASS INTERMEDIATE FILM PRODUCTION METHOD

TECHNICAL FIELD

The present invention relates to an interlayer film for a laminated glass which has a multilayer structure including two or more resin layers laminated together and can prevent optical distortion even at high temperatures. The present invention also relates to a laminated glass including the interlayer film for a laminated glass and a method of producing the interlayer film for a laminated glass.

BACKGROUND ART

A laminated glass including two glass sheets bonded with an interlayer film for a laminated glass containing a thermoplastic resin (e.g., plasticized polyvinyl butyral) therebetween is widely used as windshields of vehicles and windowpanes of aircraft, buildings, and the like.

Not only monolayer interlayer films consisting only of one resin layer, but also multilayer interlayer films consisting of a laminate of two or more resin layers have been proposed. A multilayer interlayer film for a laminated glass including a first resin layer and a second resin layer that have different characteristics will exhibit various properties that are difficult to achieve with an interlayer film consisting only of one layer.

For example, Patent Literature 1 discloses an interlayer film for a laminated glass that has a triple layer structure including a sound insulation layer interposed between two protective layers. The sound insulation layer of the interlayer film for a laminated glass of Patent Literature 1 contains a polyvinyl acetal resin highly compatible with a plasticizer and a large amount of plasticizer, thus allowing the interlayer film to exhibit excellent sound insulation properties. The protective layers prevent the large amount of plasticizer in the sound insulation layer from bleeding out, thus preventing a reduction in the adhesion between the interlayer film and the glass.

However, a laminated glass with such a multilayer interlayer film for a laminated glass has a drawback that optical distortion is often observed when external light is viewed through the laminated glass. The optical distortion is especially noticeable during exposure to high temperature. For example, the temperature of the glass of the vehicular windshield sometimes rises above 80° C. in summer. Even a laminated glass that causes almost no optical distortion at room temperature (25° C.) can cause noticeable optical distortion at high temperatures above 80° C.

CITATION LIST

Patent Literature

Patent Literature 1: JP 2007-331959 A

SUMMARY OF INVENTION

Technical Problem

In view of the above situation in the art, the present invention aims to provide an interlayer film for a laminated glass which has a multilayer structure including two or more resin layers laminated together and can prevent optical distortion even at high temperatures. The present invention also aims to provide a laminated glass including the interlayer film for a laminated glass and a method of producing the interlayer film for a laminated glass.

Solution to Problem

The present invention relates to an interlayer film for a laminated glass, the interlayer film including two or more resin layers laminated together, one resin layer having a surface with a ratio (Rz/Sm) of a ten-point average roughness Rz (μm) to an average interval Sm (μm) of projections and recesses of 0.0018 or less as measured in conformity with JIS B-0601(1994) in the following manner: a laminated glass is produced using two clear glass sheets conforming to JIS R3202(1996) and the interlayer film; the interlayer film is peeled away from the clear glass sheets after the laminated glass is cooled with liquid nitrogen; the one resin layer is peeled away from another resin layer that is in direct contact with the one resin layer; and the Rz and Sm of the surface of the one resin layer on the side having been in contact with the other resin layer are measured.

In the following, the present invention will be described in detail.

The present inventors examined the cause of the optical distortion in a multilayer interlayer film for a laminated glass including two or more resin layers laminated together. They found out that there are fine projections and recesses on the interface between the resin layers, and that these projections and recesses cause optical distortion.

As a result of intensive studies, the present inventors found out that projections and recesses on the interface between the resin layers are produced during the process of producing the interlayer film for a laminated glass. Specifically, the production of a multilayer interlayer film for a laminated glass usually includes co-extrusion of resin compositions, which are materials for resin layers, with a co-extruder to prepare a laminate including resin layers. During the co-extrusion, extruding conditions such as the extruding rate are set to be uniform; however, in actual, the extruding conditions fluctuate and greatly vary. This variation in the extruding conditions causes distortion between the extruded resin layers, which results in projections and recesses on the resin layers. These projections and recesses are less appreciable at room temperature. However, they are considered to develop to cause optical distortion as the resin layers become flexible at high temperature.

As a result of further intensive studies, the present inventors found out that uniform extruding conditions can be achieved by controlling the variation range of the inlet pressure below a certain value when the resin compositions are transferred from the extruders to the respective gear pumps during co-extrusion using a co-extruder. They found out that such uniform conditions allow control of the form of the projections and recesses on the interface between the resin layers, leading to reduced optical distortion. They thus completed the present invention.

The interlayer film for a laminated glass of the present invention has a multilayer structure including two or more resin layers laminated together. For example, when the two or more resin layers include a first resin layer and a second resin layer, and the first and second resin layers have different characteristics, the interlayer film can exhibit various properties that are difficult to achieve with only one layer. In order to improve the sound insulation properties of the laminated glass, for example, a sound insulation layer and a protective layer may be used in combination.

In the interlayer film for a laminated glass of the present invention, the difference in the refractive index between the two or more resin layers is preferably 0.03 or less, more preferably 0.015. This further prevents the optical distortion.

The resin layers preferably each contain a thermoplastic resin.

Examples of the thermoplastic resin include polyvinylidene fluoride, polytetrafluoroethylene, vinylidene fluoride-hexafluoropropylene copolymer, polytrifluoroethylene, acrylonitrile-butadiene-styrene copolymer, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymer. In particular, polyvinyl acetal and ethylene-vinyl acetate copolymer are preferred, and polyvinyl acetal is more preferred.

The resin layers preferably each contain polyvinyl acetal and a plasticizer.

Any plasticizer commonly used for an interlayer film for a laminated glass can be used. Examples thereof include organic plasticizers such as monobasic organic acid esters or polybasic organic acid esters, and phosphoric acid plasticizers such as organophosphate compounds or organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. In particular, the resin layers each preferably contain triethylene glycol-di-2-ethylhexanoate, triethylene glycol-di-2-ethylbutyrate, or triethylene glycol-di-n-heptanoate, more preferably contain triethylene glycol-di-2-ethylhexanoate.

The resin layers preferably each contain an adhesion modifier. Especially a resin layer to be in contact with glass during the production of the laminated glass preferably contains the adhesion modifier.

The adhesion modifier is preferably, for example, an alkali metal salt or an alkaline earth metal salt. Examples of the adhesion modifier include salts such as potassium, sodium, and magnesium salts.

Examples of the acid constituting the salts include carboxylic organic acids such as octylic acid, hexylic acid, 2-ethylbutyric acid, butyric acid, acetic acid, and formic acid and inorganic acids such as hydrochloric acid and nitric acid. For easy adjustment of the adhesion between glass and the resin layers during production of the laminated glass, a resin layer to be in contact with glass preferably contains a magnesium salt as an adhesion modifier.

The resin layers may optionally contain additives such as an antioxidant, a light stabilizer, modified silicone oil as an adhesion modifier, a flame retardant, an antistatic agent, a moisture-proof agent, a heat reflecting agent, and a heat absorbing agent.

The interlayer film for a laminated glass of the present invention includes at least a first resin layer and a second resin layer as the two or more resin layers. The hydroxy group content of polyvinyl acetal (hereafter, referred to as polyvinyl acetal A) in the first resin layer is preferably different from the hydroxy group content of polyvinyl acetal (hereafter, referred to as polyvinyl acetal B) in the second resin layer.

Since the polyvinyl acetal A and the polyvinyl acetal B have different properties, the interlayer film for a laminated glass can exhibit various properties that are difficult to achieve with one layer. For example, in a case where the first resin layer is interposed between two second resin layers and the hydroxy group content of the polyvinyl acetal A is smaller than the hydroxy group content of the polyvinyl acetal B, the first resin layer tends to have a lower glass transition temperature than the second resin layer. As a result, the first resin layer is softer than the second resin layer, so that the interlayer film for a laminated glass has better sound insulation properties. For another example, in a case where the first resin layer is interposed between two second resin layers and the hydroxy group content of the polyvinyl acetal A is greater than the hydroxy group content of the polyvinyl acetal B, the first resin layer tends to have a higher glass transition temperature than the second resin layer. As a result, the first resin layer is harder than the second resin layer, so that the interlayer film for a laminated glass has better penetration resistance.

Moreover, in a case where the first resin layer and the second resin layer contain a plasticizer, the plasticizer content (hereafter, referred to as content A) of the first resin layer based on 100 parts by mass of polyvinyl acetal is preferably different from the plasticizer content (hereafter, referred to as content B) of the second resin layer based on 100 parts by mass of polyvinyl acetal. For example, in a case where the first resin layer is interposed between two second resin layers and the content A is greater than the content B, the first resin layer tends to have a lower glass transition temperature than the second resin layer. As a result, the first resin layer is softer than the second resin layer, so that the interlayer film for a laminated glass has better sound insulation properties. In a case where the first resin layer is interposed between two second resin layers and the content A is smaller than the content B, the first resin layer tends to have a higher glass transition temperature than the second resin layer. As a result, the first resin layer is harder than the second resin layer, so that the interlayer film for a laminated glass has better penetration resistance.

An exemplary combination of two or more resin layers included in the interlayer film for a laminated glass of the present invention includes a sound insulation layer as the first resin layer and a protective layer as the second resin layer with an aim of improving the sound insulation properties of the laminated glass. Preferably, the sound insulation layer contains polyvinyl acetal X and a plasticizer and the protective layer contains polyvinyl acetal Y and a plasticizer because the laminated glass can have better sound insulation properties. Moreover, in a case where the sound insulation layer is interposed between two protective layers, an interlayer film for a laminated glass excellent in sound insulation properties (hereafter, also referred to as a sound insulation interlayer film) can be obtained. Hereafter, a sound insulation interlayer film is more specifically described.

In the sound insulation interlayer film, the sound insulation layer has a function of imparting sound insulation properties. The sound insulation layer preferably contains polyvinyl acetal X and a plasticizer.

The polyvinyl acetal X can be prepared by acetalization of polyvinyl alcohol with an aldehyde. The polyvinyl acetal X is preferably a product obtained by acetalization of polyvinyl alcohol. The polyvinyl alcohol can be commonly obtained by saponification of polyvinyl acetate.

The lower limit of the average degree of polymerization of the polyvinyl alcohol is preferably 200, whereas the upper limit thereof is preferably 5000. When the average degree of polymerization of the polyvinyl alcohol is 200 or higher, the penetration resistance of the sound insulation interlayer film to be obtained can be improved. When the average degree of polymerization of the polyvinyl alcohol is 5000 or lower, the formability of the sound insulation layer can be ensured. The lower limit of the average degree of polymerization of the polyvinyl alcohol is more preferably 500, whereas the upper limit thereof is more preferably 4000.

The average degree of polymerization of the polyvinyl alcohol can be determined in conformity with JIS K6726 "Testing methods for polyvinyl alcohol".

The lower limit of the carbon number of an aldehyde used for acetalization of the polyvinyl alcohol is preferably 4, whereas the upper limit thereof is preferably 6. When the carbon number of the aldehyde is 4 or greater, the sound insulation layer can stably contain a sufficient amount of a plasticizer to exhibit excellent sound insulation properties. Moreover, bleed-out of the plasticizer can be prevented. When the carbon number of the aldehyde is 6 or less, the synthesis of the polyvinyl acetal X is facilitated to ensure the productivity.

The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the sound insulation layer can contain the plasticizer in an amount needed for exhibiting sound insulation properties, and bleed-out of the plasticizer can be prevented. The upper limit of the hydroxy group content of the polyvinyl acetal X is more preferably 28 mol %, still more preferably 26 mol %, particularly preferably 24 mol %, whereas the lower limit thereof is preferably 10 mol %, more preferably 15 mol %, still more preferably 20 mol %. The hydroxy group content of the polyvinyl acetal X is a value in percentage (mol %) of the mole fraction obtained by dividing the amount of ethylene groups to which hydroxy groups are bonded by the amount of all the ethylene groups in the main chain. The amount of ethylene groups to which hydroxy groups are bonded can be obtained by measuring the amount of ethylene groups to which hydroxy groups are bonded in the polyvinyl acetal X in conformity with JIS K6728 "Testing methods for polyvinyl butyral".

The lower limit of the acetal group content of the polyvinyl acetal X is preferably 60 mol %, whereas the upper limit thereof is preferably 85 mol %. When the acetal group content of the polyvinyl acetal X is 60 mol % or more, the sound insulation layer has higher hydrophobicity and can contain a plasticizer in an amount needed for exhibiting sound insulation properties, and bleed-out of the plasticizer and whitening can be prevented. When the acetal group content of the polyvinyl acetal X is 85 mol % or less, the synthesis of the polyvinyl acetal X is facilitated to ensure the productivity. The lower limit of the acetal group content of the polyvinyl acetal X is more preferably 65 mol %, still more preferably 68 mol %.

The acetal group content can be obtained by measuring the amount of ethylene groups to which acetal groups are bonded in the polyvinyl acetal X in conformity with JIS K6728 "Testing methods of polyvinyl butyral".

The lower limit of the acetyl group content of the polyvinyl acetal X is preferably 0.1 mol %, whereas the upper limit thereof is preferably 30 mol %. When the acetyl group content of the polyvinyl acetal X is 0.1 mol % or more, the sound insulation layer can contain a plasticizer in an amount needed for exhibiting sound insulation properties, and bleed-out of the plasticizer can be prevented. When the acetyl group content of the polyvinyl acetal X is 30 mol % or less, the sound insulation layer has higher hydrophobicity to prevent whitening. The lower limit of the acetyl group content is more preferably 1 mol %, still more preferably 5 mol %, particularly preferably 8 mol %, whereas the upper limit thereof is more preferably 25 mol %, still more preferably 20 mol %. The acetyl group content is a value in percentage (mol %) of the mole fraction obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain.

In particular, the polyvinyl acetal X is preferably polyvinyl acetal with an acetyl group content of 8 mol % or more or polyvinyl acetal with an acetyl group content of less than 8 mol % and an acetal group content of 65 mol % or more because the sound insulation layer can easily contain a plasticizer in an amount needed for exhibiting sound insulation properties. The polyvinyl acetal X is more preferably polyvinyl acetal having an acetyl group content of 8 mol % or more or polyvinyl acetal having an acetyl group content of less than 8 mol % and an acetal group content of 68 mol % or more.

The lower limit of the plasticizer content of the sound insulation layer is preferably 45 parts by mass, whereas the upper limit thereof is preferably 80 parts by mass based on 100 parts by mass of the polyvinyl acetal X. When the plasticizer content is 45 parts by mass or more, high sound insulation properties can be exhibited. When the plasticizer content is 80 parts by mass or less, bleed-out of the plasticizer is prevented, so that the transparency or adhesiveness of the interlayer film for a laminated glass is not lowered. The lower limit of the plasticizer content is more preferably 50 parts by mass, still more preferably 55 parts by mass, whereas the upper limit thereof is more preferably 75 parts by mass, still more preferably 70 parts by mass. The plasticizer content of the sound insulation layer may be a plasticizer content before the production of a laminated glass, or may be a plasticizer content after the production of a laminated glass. The plasticizer content after the production of a laminated glass can be measured in the following manner: A laminated glass is produced and then allowed to stand for four weeks at a temperature of 25° C. and a humidity of 30%; the laminated glass is then cooled with liquid nitrogen, whereby the interlayer film for a laminated glass is peeled away from the glass. The obtained sound insulation layer is cut in the thickness direction, followed by standing for two hours at a temperature of 25° C. and a humidity of 30%. Then a finger or apparatus is put between the protective layer and the sound insulation layer, and the layers are peeled away from each other at a temperature of 25° C. and a humidity of 30%, whereby 10 g of a rectangular specimen is obtained for each of the protective layer and the sound insulation layer. The obtained specimens were each subjected to extraction of the plasticizer for 12 hours using a Soxhlet extractor with diethyl ether. Thereafter, the amount of the plasticizer in each specimen is determined to determine the plasticizer content in each of the protective layer and the intermediate layer.

The lower limit of the thickness of the sound insulation layer is preferably 50 μm. When the thickness of the sound insulation layer is 50 μm or more, sufficient sound insulation properties can be exhibited. The lower limit of the thickness of the sound insulation layer is more preferably 80 μm. The upper limit thereof is not particularly limited, and is preferably 300 μm in consideration of the thickness as an interlayer film for a laminated glass.

The protective layer has a function of preventing bleed-out of a large amount of a plasticizer contained in the sound insulation layer to prevent lowering of the adhesiveness between the interlayer film for a laminated glass and glass and imparting penetration resistance to the interlayer film for a laminated glass.

The protective layer preferably contains, for example, polyvinyl acetal Y and a plasticizer, more preferably polyvinyl acetal Y with a greater hydroxy group content than the polyvinyl acetal X and a plasticizer.

The polyvinyl acetal Y can be prepared by acetalization of polyvinyl alcohol with an aldehyde. The polyvinyl acetal Y is preferably a product obtained by acetalization of polyvinyl alcohol. The polyvinyl alcohol can be commonly obtained by saponification of polyvinyl acetate.

The lower limit of the average degree of polymerization of the polyvinyl alcohol is preferably 200, whereas the upper limit thereof is preferably 5000. When the average degree of polymerization of the polyvinyl alcohol is 200 or more, the penetration resistance of the interlayer film for a laminated glass can be improved. When the average degree of polymerization of the polyvinyl alcohol is 5000 or less, the formability of the protective layer can be ensured. The lower limit of the average degree of polymerization of the polyvinyl alcohol is more preferably 500, whereas the upper limit thereof is more preferably 4000.

The lower limit of the carbon number of an aldehyde used for acetalization of the polyvinyl alcohol is preferably 3, whereas the upper limit thereof is preferably 4. When the carbon number of the aldehyde is 3 or greater, the penetration resistance of the interlayer film for a laminated glass is improved. When the carbon number of the aldehyde is 4 or less, the productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, whereas the lower limit thereof is preferably 28 mol %. When the hydroxy group content of the polyvinyl acetal Y is 33 mol % or less, whitening of the interlayer film for a laminated glass can be prevented. When the hydroxy group content of the polyvinyl acetal Y is 28 mol % or more, the penetration resistance of the interlayer film for a laminated glass can be improved.

The lower limit of the acetal group content of the polyvinyl acetal Y is preferably 60 mol %, whereas the upper limit thereof is preferably 80 mol %. When the acetal group content is 60 mol % or more, the protective layer can contain a plasticizer in an amount needed for exhibiting sufficient penetration resistance. When the acetal group content is 80 mol % or less, the adhesiveness between the protective layer and glass can be ensured. The lower limit of the acetal group content is more preferably 65 mol %, whereas the upper limit thereof is more preferably 69 mol %.

The upper limit of the acetyl group content of the polyvinyl acetal Y is preferably 7 mol %. When the acetyl group content of the polyvinyl acetal Y is 7 mol % or less, the protective layer has higher hydrophobicity, thereby preventing whitening. The upper limit of the acetyl group content is more preferably 2 mol %, whereas the lower limit thereof is preferably 0.1 mol %. The hydroxy group contents, acetal group contents, and acetyl group contents of the polyvinyl acetals A, B, and Y can be measured by the similar method as in the case of the polyvinyl acetal X.

The lower limit of the plasticizer content of the protective layer is preferably 20 parts by mass, whereas the upper limit thereof is preferably 45 parts by mass based on 100 parts by mass of the polyvinyl acetal Y. When the plasticizer content is 20 parts by mass or more, the penetration resistance can be ensured. When the plasticizer content is 45 parts by mass or less, bleed-out of the plasticizer can be prevented, so that the transparency or adhesiveness of the interlayer film for a laminated glass is not lowered. The lower limit of the plasticizer content is more preferably 30 parts by mass, still more preferably 35 parts by mass, whereas the upper limit thereof is more preferably 43 parts by mass, still more preferably 41 parts by mass. The plasticizer content of the protective layer is preferably smaller than the plasticizer content of the sound insulation layer because sound insulation properties can be further improved in the laminated glass. The plasticizer content of the protective layer may be a plasticizer content before the production of a laminated glass, or may be a plasticizer content after the production of a laminated glass. The plasticizer content after the production of a laminated glass can be measured in the same manner as for the sound insulation layer.

The hydroxy group content of the polyvinyl acetal Y is preferably greater than the hydroxy group content of the polyvinyl acetal X, more preferably greater by 1 mol % or more, still more preferably greater by 5 mol % or more, particularly preferably greater by 8 mol % or more because the sound insulation properties of the laminated glass is further improved. Adjustment of the hydroxy group contents of the polyvinyl acetal X and the polyvinyl acetal Y allows control of the plasticizer contents in the sound insulation layer and the protective layer, lowering the glass transition temperature of the sound insulation layer. As a result, the sound insulation properties of the laminated glass are further improved.

The plasticizer content (hereafter, also referred to as content X) based on 100 parts by mass of the polyvinyl acetal X in the sound insulation layer is preferably greater than the plasticizer content (hereafter, also referred to as content Y) based on 100 parts by mass of the polyvinyl acetal Y in the protective layer, more preferably greater by 5 parts by mass or more, still more preferably greater by 15 parts by mass or more, particularly preferably greater by 20 parts by mass or more because the sound insulation properties of the laminated glass is still further improved. Adjustment of the content X and the content Y lowers the glass transition temperature of the sound insulation layer. As a result, the sound insulation properties of the laminated glass are still further improved.

The thickness of the protective layer is not limited as long as it is adjusted within the range that allows the layer to serve as a protective layer. When the protective layer has projections and recesses thereon, the protective layer is preferably as thick as possible in order to prevent the transcription of the projections and recesses into the interface between the protective layer and the sound insulation layer in direct contact therewith. Specifically, the lower limit of the thickness of the protective layer is preferably 100 μm, more preferably 300 μm, still more preferably 400 μm, particularly preferably 450 μm. The upper limit of the thickness of the protective layer is not limited. In order to ensure the thickness enough to achieve sufficient sound insulation properties, the upper limit is practically about 500 μm.

The sound insulation interlayer film may be produced by any method. For example, sheets of the sound insulation layer and the protective layer are formed by a usual sheet formation method such as an extrusion method, a calender method, or a press method, and then these sheets are laminated.

In the interlayer film for a laminated glass of the present invention, one resin layer has a surface with a ratio (Rz/Sm)

of a ten-point average roughness Rz (μm) to an average interval Sm (μm) of projections and recesses of 0.0018 or less as measured in conformity with JIS B-0601(1994) in the following manner: a laminated glass is produced using two clear glass sheets conforming to JIS R3202(1996) and the interlayer film; the interlayer film is peeled away from the clear glass sheets after the laminated glass is cooled with liquid nitrogen; the one resin layer is peeled away from another resin layer that is in direct contact with the one resin layer; and the Rz and Sm of the surface of the one resin layer on the side having been in contact with the other resin layer are measured.

As mentioned above, optical distortion is caused by projections and recesses on the interface between the resin layers; however, it is very difficult to directly observe the projections and recesses on the interface between the resin layers. The projections and recesses on the interface between the resin layers can be indirectly evaluated by peeling the resin layers away from each other and performing measurement of projections and recesses on a surface of the peeled resin layer, instead of directly observing the projections and recesses on the interface between the resin layers. The optical distortion due to the projections and recesses on the interface between the resin layers can be reduced by adjusting the ratio (Rz/Sm) of the ten-point average roughness Rz (μm) to the average interval Sm (μm) of the projections and recesses on the surface of the peeled resin layer below a certain value. This is presumably because the effect of refracting light to scatter or concentrate light like that of a lens can be reduced. The Rz/Sm is preferably 0.0164 or less, more preferably 0.00120 or less, still more preferably 0.0110 or less, particularly preferably 0.0100 or less.

In order to minimize optical distortion, the interlayer film for a laminated glass of the present invention most preferably satisfies the above Rz/Sm at the entire surface thereof; however, the interlayer film may satisfy the Rz/Sm in a part of the interlayer film. For example, when a laminated glass including the interlayer film for a laminated glass of the present invention is used as a vehicular windshield, as shown in FIG. 3(a) and FIG. 3(b), the interlayer film for a laminated glass preferably satisfies the Rz/Sm at least in the area 15 to 30 cm away from the lower end of the windshield. A stretched interlayer film for a laminated glass tends to have high Rz/Sm value. In an interlayer film for a laminated glass, an area closer to the lower end of a vehicular windshield is more likely to be stretched. In particular, the area 15 to 30 cm away from the lower end of a vehicular windshield is easily stretched, and additionally, this area easily gets within the driver's sight. Optical distortion is thus more markedly sensed in the area. Accordingly, when the interlayer film for a laminated glass satisfies the Rz/Sm at least in the area 15 to 30 cm away from the lower end of a vehicular windshield, a reduction in optical distortion can be more markedly sensed.

An interlayer film for a laminated glass shown in FIG. 1 has a two-layer structure including a resin layer 20 and a resin layer 30 laminated together. According to the present invention, a laminated glass is produced using this two-layer interlayer film for a laminated glass and two clear glass sheets 1. The interlayer film for a laminated glass is peeled away from the clear glass sheets 1 after the laminated glass is cooled with liquid nitrogen. The resin layer 20 of the interlayer film for a laminated glass is then peeled away from the resin layer 30. The ten-point average roughness Rz and the average interval Sm of projections and recesses of a surface 21 of the peeled resin layer 20 on the side having been in contact with the resin layer 30 are measured.

An interlayer film for a laminated glass shown in FIG. 2 has a three-layer structure including a resin layer 20, a resin layer 10, and a resin layer 30 laminated in the stated order. According to the present invention, a laminated glass is produced using this three-layer interlayer film for a laminated glass and two clear glass sheets 1. The interlayer film for a laminated glass is peeled away from the clear glass sheets 1 after the laminated glass is cooled with liquid nitrogen. The resin layer 20 of the interlayer film for a laminated glass is then peeled away from the resin layer 10. The ten-point average roughness Rz and the average interval Sm of projections and recesses of a surface 21 of the peeled resin layer 20 on the side having been in contact with the resin layer 10 are measured.

The resin layers are peeled away from each other in the following manner. First, the laminated glass is cooled with liquid nitrogen, whereby the interlayer film for a laminated glass is peeled away from the glass. Next, the peeled interlayer film for a laminated glass is cut into a size of 5 cm long×5 cm wide and allowed to stand for two hours at a temperature of 25° C. and a humidity of 30%. A finger or apparatus is put between a layer A and a layer B, and the layers are peeled away from each other at 1 to 5 cm/s at a temperature of 25° C. and a humidity of 30%. Setting the temperature, the humidity, and the peeling rate to certain values reduces variations in the measured values. The peeling can be performed mechanically or manually with fingers provided that the above conditions are satisfied.

If the ten-point average roughness Rz and the average interval Sm of projections and recesses of the surface are measured immediately after peeling the resin layers, the measured values may vary. The ten-point average roughness Rz and the average interval Sm of projections and recesses are thus preferably measured after standing for two hours at a temperature of 25° C. and a humidity of 30%.

After peeling the resin layers at certain conditions and standing as described above, the ten-point average roughness Rz and the average interval Sm of projections and recesses of the surface are measured.

The ten-point average roughness Rz and the average interval Sm of projections and recesses herein are measured in conformity with JIS B 0601(1994) "Surface roughness—Definitions and designation". The ten-point average roughness Rz and the average interval Sm of projections and recesses can be easily measured with a high-accuracy profile measurement system ("KS-1100", model number of head: LT-9510VM, produced by Keyence Corporation), for example. The measurement is preferably performed under the following conditions: the stage travel rate: 1000 μm/s, the measurement pitch of X-axis: 10 μm, the measurement pitch of Y-axis: 10 μm, and the measuring field: 2.5 cm along the machine direction in the production of the interlayer film for a laminated glass by 1 cm along the direction perpendicular to the machine direction. The resulting data can be analyzed with analysis software (e.g., KS-Analyzer, produced by Keyence Corporation). Roughness profile is obtained by line roughness (1994JIS) analysis at a horizontal line condition. The obtained profile is subjected to height smoothing correction (cut-off value: 2.50 mm, simple average: ±12) and then the Rz and Sm are measured. Each of the Rz and Sm is measured as the average of randomly selected three points that are spaced by at least 1 mm in the perpendicular direction of the image. The layer B and a layer C are peeled away from each other in the same manner, and the ten-point average roughness Rz and the average interval Sm of projections and recesses of the surface of the peeled layer C on the side of the layer B are measured.

The ten-point average roughness Rz of the surface of the peeled resin layer is preferably 2.0 μm or less. When the Rz is 2.0 μm or less, optical distortion can be further prevented. The Rz is more preferably 1.8 μm or less, still more preferably 1.35 μm or less, particularly preferably 1.1 μm or less, most preferably 0.9 μm or less.

The average interval Sm of the projections and recesses of the surface of the peeled resin layer is preferably 190 μm or more. When the Sm is 190 μm or more, optical distortion can further be prevented. The Sm is more preferably 300 μm or more.

The present invention also encompasses an interlayer film for a laminated glass, the interlayer film including: two or more resin layers laminated together, one resin layer, before production of a laminated glass, having a surface with a ratio (Rz/Sm) of a ten-point average roughness Rz (μm) to an average interval Sm (μm) of projections and recesses of 0.00110 or less as measured in conformity with JIS B-0601 (1994) in the following manner: the one resin layer is peeled away from another resin layer that is in direct contact with the one resin layer; and the Rz and Sm of the surface of the one resin layer on the side having been in contact with the other resin layer are measured.

Optical distortion at high temperatures can be reduced also in the case that the interlayer film for a laminated glass before the production of laminated glass has the above Rz/Sm value. The Rz/Sm before the production of a laminated glass is preferably 0.00100 or less, more preferably 0.00080 or less. The Rz/Sm before the production of a laminated glass can be determined in the same manner as the Rz/Sm after the production of a laminated glass except for omission of cooling of a laminated glass with liquid nitrogen and peeling of the interlayer film for a laminated glass from glass sheets.

The ten-point average roughness Rz of the surface of the peeled resin layer before the production of a laminated glass is preferably 1.5 μm or less. When the Rz is 1.5 μm or less, optical distortion can be further reduced. The Rz is more preferably 1.2 μm or less, still more preferably 1.0 μm or less.

The average interval Sm of projections and recesses of the surface of the peeled resin layer before the production of a laminated glass is preferably 190 μm or more. When the Sm is 190 μm or more, optical distortion can be further reduced. The Sm is more preferably 300 μm or more.

The following method can be used to adjust the Rz/Sm of the surface of the peeled resin layer after the production of a laminated glass to 0.0018 or less and adjust the Rz/Sm of the surface of the peeled resin layer before the production of a laminated glass to 0.00110 or less. That is, when the resin compositions as materials for the resin layers are co-extruded with a co-extruder, the variation range of the inlet pressure of each extruder within 30 seconds is controlled to 0.5% or less. The variation range of the inlet pressure within 30 seconds of 0.5% or less prevents the distortion between the extruded resin layers, and thus prevents formation of projections and recesses on the interface between the resin layers. The variation range of the inlet pressure is preferably 0.3% or less, more preferably 0.2% or less.

The variation in the inlet pressure can be controlled by, for example, installing a pressure measuring device at the inlet of each gear pump of the co-extruder, sending the inlet pressure data obtained with the device to a computer in real time, and precisely changing the extrusion rate based on the data.

The present invention also encompasses a method of producing an interlayer film for a laminated glass including two or more resin layers laminated together, the method including the step of co-extruding resin compositions as materials for the two or more resin layers with a co-extruder including extruders so as to provide a laminate including two or more resin layers laminated together, each extruder having a variation range of the inlet pressure within 30 seconds of 0.5% or less in the co-extrusion using the co-extruder.

In order to ensure deaeration properties in the production of a laminated glass, the interlayer film for a laminated glass of the present invention may have a large number of recesses and a large number of projections on at least one surface thereof. With these recesses and projections, the deaeration properties in the production of a laminated glass can be ensured. The interlayer film may have projections and recesses on only one surface thereof or on both surfaces thereof.

The interlayer film for a laminated glass of the present invention preferably has a large number of recesses on at least one surface thereof. In order to further reduce optical distortion, the ten-point average roughness Rz of the at least one surface having the large number of recesses is preferably 60 μm or less, more preferably 50 μm or less as measured in conformity with JIS B-0601(1994). In order to further improve the deaeration properties in the production of a laminated glass, the ten-point average roughness Rz of the at least one surface having the large number of recesses is preferably 10 μm or more, more preferably 20 μm or more as measured in conformity with JIS B-0601(1994).

When the interlayer film for a laminated glass of the present invention has a large number of recesses and a large number of projections on at least one surface thereof, the projections and recesses may be imparted to the film by any method, for example, an emboss roll method, a calender roll method, a profile extrusion method, or an extrusion lip embossing method utilizing melt fracture. Here, it is important to select such conditions that the projections and recesses are not transferred into the interface between the resin layers when the projections and recesses are imparted to the film. A recently proposed method imparts projections and recesses by specially shaping the lip of the die for the co-extrusion with a co-extruder. This so-called lip method is preferable because it is free of the transcription of projections and recesses into the interface between the resin layers.

The interlayer film for a laminated glass of the present invention is suitable for vehicle uses, in particular for vehicular windshields.

A laminated glass including a pair of glass sheets and the interlayer film for a laminated glass of the present invention therebetween is also encompassed by the present invention.

The glass sheets may be commonly used transparent plate glass. Examples thereof include inorganic glass such as float plate glass, polished plate glass, molded plate glass, wired glass, wire-reinforced plate glass, colored plate glass, heat-absorbing glass, heat-reflecting glass, and green glass. Also usable are UV light-shielding glass having a UV light-shielding coating on the surface of glass and organic plastic plates such as plates of polyethylene terephthalate, polycarbonate, and polyacrylate.

The glass sheets may include two or more different glass sheets. For example, the laminated glass may include a transparent float plate glass and a colored glass sheet such as green glass with the interlayer film for a laminated glass of the present invention therebetween. Furthermore, the glass sheets may include two or more glass sheets having different thicknesses.

Advantageous Effects of Invention

The present invention provides an interlayer film for a laminated glass which has a multilayer structure including two or more resin layers laminated together and can prevent optical distortion even at high temperatures. The present invention also provides a laminated glass including the interlayer film for a laminated glass and a method of producing the interlayer film for a laminated glass.

DESCRIPTION OF EMBODIMENTS

Figure 1:
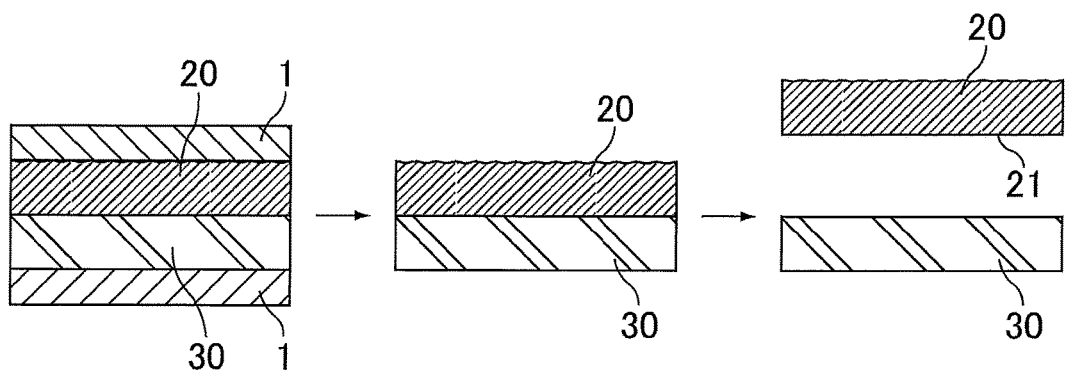
FIG. 1 is a schematic view illustrating, in a two-layer interlayer film for a laminated glass, a surface on which the ten-point average roughness Rz and the average interval Sm of projections and recesses are measured.
Figure 2:
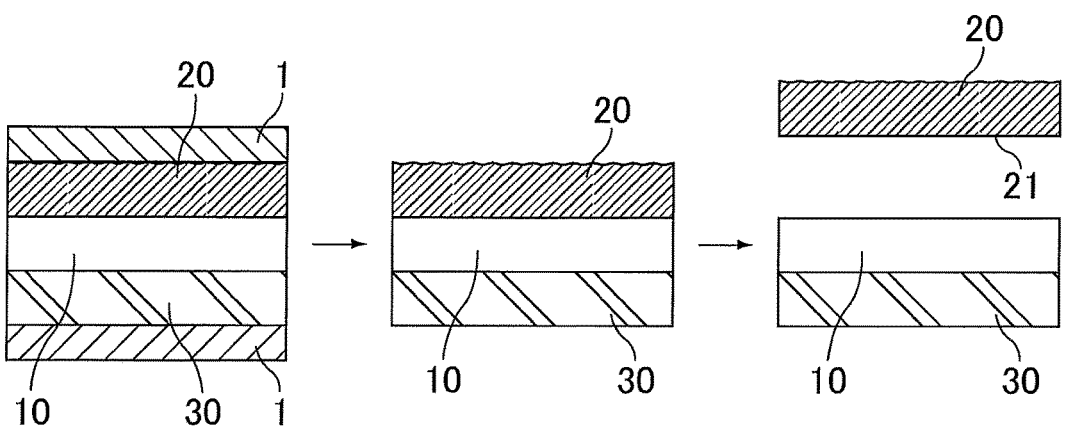
FIG. 2 is a schematic view illustrating, in a three-layer interlayer film for a laminated glass, a surface on which the ten-point average roughness Rz and the average interval Sm of projections and recesses are measured.
Figure 3A:
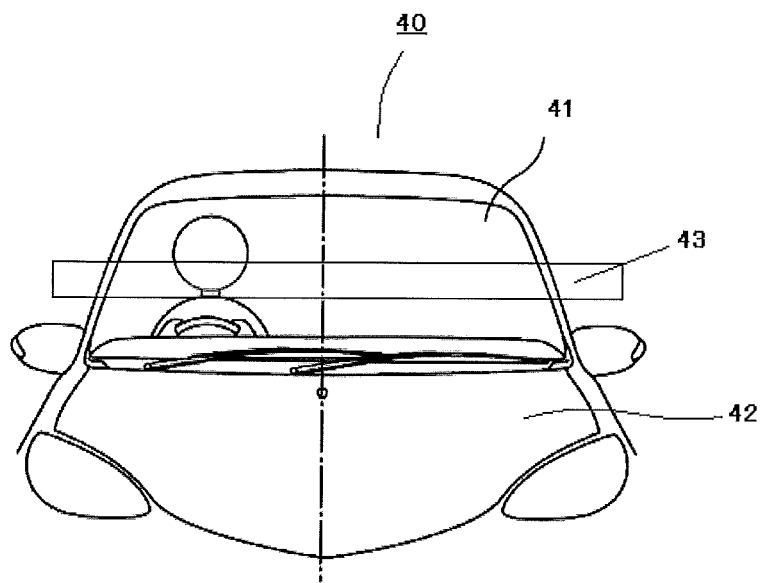
FIG. 3(a) is a schematic frontal view of the area where the interlayer film for a laminated glass should satisfy the Rz/Sm specified in the present invention when the interlayer film is used in a vehicular windshield.
Figure 3B:
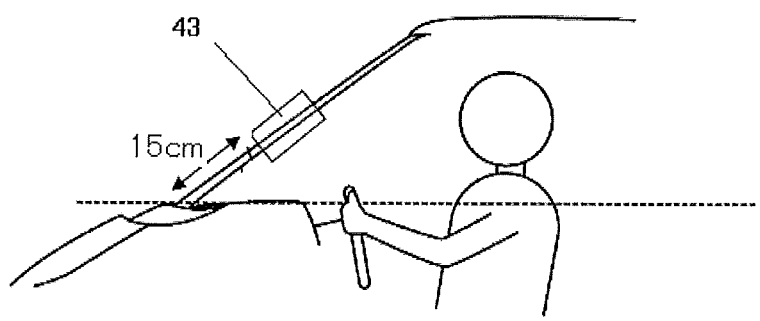
FIG. 3(b) is a schematic side view of the area where the interlayer film for a laminated glass should satisfy the Rz/Sm specified in the present invention when the interlayer film is used in a vehicular windshield.

Embodiments of the present invention will be described in detail below with reference to examples. The present invention is not limited to these examples.

EXAMPLE 1

(1) Preparation of Resin Composition for Intermediate Layer

Polyvinyl butyral (acetyl group content: 12.0 mol %, butyral group content: 65.0 mol %, hydroxy group content: 23.0 mol %) was obtained by acetalizing polyvinyl alcohol having an average degree of polymerization of 2400 with n-butyraldehyde. To 100 parts by mass of the polyvinyl butyral was added 60 parts by mass of triethylene glycol-di-2-ethylhexanoate (3GO) as a plasticizer. The mixture was sufficiently kneaded with a mixing roll to provide a resin composition for an intermediate layer.

(2) Preparation of Resin Composition for Protective Layer

Polyvinyl butyral (acetyl group content: 1.0 mol %, butyral group content: 69.0 mol %, hydroxy group content: 30.0 mol %) was obtained by acetalizing polyvinyl alcohol having an average degree of polymerization of 1700 with n-butyraldehyde. To 100 parts by mass of the polyvinyl butyral was added 40 parts by mass of triethylene glycol-di-2-ethylhexanoate (3GO) as a plasticizer. The mixture was sufficiently kneaded with a mixing roll to provide a resin composition for a protective layer.

(3) Preparation of Interlayer Film for Laminated Glass

The resin composition for an intermediate layer and the resin composition for a protective layer obtained above were co-extruded with a co-extruder to prepare a three-layer interlayer film for a laminated glass in which a layer A (protective layer), a layer B (intermediate layer), and a layer C (protective layer) were laminated in the stated order. The layer A was formed of the resin composition for a protective layer and had a thickness of 350 μm, the layer B was formed of the resin composition for an intermediate layer and had a thickness of 100 μm, and the layer C was formed of the resin composition for a protective layer and had a thickness of 350 μm. The co-extruder used had a pressure measuring device installed at the inlet of each gear pump, and the pressure measuring device sent the measured inlet pressure data to a computer on real time. The extruding rate was precisely changed based on the data, whereby the variation range of the inlet pressure of each extruder within 30 seconds was controlled to 0.4% or less.

(4) Impartment of Projections and Recesses

In the first step, a pattern of projections and recesses was randomly transferred to both surfaces of the interlayer film for a laminated glass by the following process. First, random projections and recesses were formed on iron roll surfaces with an abrasive material, and the iron rolls were subjected to vertical grinding. Finer projections and recesses were further formed on planar portions after the grinding, with a finer abrasive material. In this manner, a pair of rolls in the same shape having a coarse main embossed pattern and a fine sub-embossed pattern were obtained. The pair of rolls was used as a device for transferring a pattern of projections and recesses to transfer a random pattern of projections and recesses to both faces of the obtained interlayer film for a laminated glass. The transferring conditions employed here were a temperature of the interlayer film for a laminated glass of 80° C., a temperature of the rolls of 145° C., a linear velocity of 10 m/min, and a linear pressure of 50 to 100 kN/m. The shaped interlayer film for a laminated glass had a surface roughness measured based on the ten-point average roughness Rz in conformity with JIS B 0601(1994) of 35 μm. The surface roughness was determined by processing data of a digital signal measured with a surface roughness measuring device (produced by Kosaka Laboratory Ltd., SE1700a). The measurement direction was perpendicular to the engraved lines. Measurement was performed under the conditions of a cut-off value of 2.5 mm, a standard length of 2.5 mm, an evaluation length of 12.5 mm, a tip radius of a probe of 2 μm, a tip angle of 60°, and a measurement speed of 0.5 mm/s.

In the second step, projections and recesses having a groove shape with a continuous bottom (shape of an engraved line) were imparted to a surface of the interlayer film for a laminated glass by the following process.

A pair of rolls including a metal roll having a surface milled with a triangular oblique line-type mill and a rubber roll having a JIS hardness of 45 to 75 was used as a device for transferring a pattern of projections and recesses. The obtained interlayer film for a laminated glass to which the random pattern of projections and recesses was transferred in the first step was passed through the device for transferring a pattern of projections and recesses, whereby projections and recesses in which recesses having a groove shape with a continuous bottom (shape of an engraved line) were arranged in parallel with one another at equal intervals were imparted to the surface of the layer A of the interlayer film for a laminated glass. The transferring was performed under the conditions of a temperature of the interlayer film for a laminated glass of 75° C., a temperature of the rolls of 130° C., a linear velocity of 10 m/min, a film width of 1.5 m, and a pressure of 500 kPa.

Subsequently, the similar treatment was performed to impart recesses having a groove shape with a continuous bottom (shape of an engraved line) to the surface of the layer C of the interlayer film for a laminated glass, except that the shape of the projections and recesses on a metal roll used was different. Here, the recesses having a groove shape with a continuous bottom (shape of an engraved line) imparted to the surface of the layer A and the recesses having a groove shape with a continuous bottom (shape of an engraved line) imparted to the surface of the layer C were set to form a crossing angle of 10°.

The surface roughness of the resulting interlayer film for a laminated glass determined based on the ten-point average roughness Rz in conformity with JIS B 0601(1994) was 50 μm. The surface roughness was determined by processing data of a digital signal measured with a surface roughness measuring device (produced by Kosaka Laboratory Ltd., SE1700a). The measurement direction was perpendicular to the engraved line. Measurement was performed under the conditions of a cut-off value of 2.5 mm, a standard length of 2.5 mm, an evaluation length of 12.5 mm, a tip radius of a probe of 2 μm, a tip angle of 60°, and a measurement speed of 0.5 mm/s.

(5) Preparation of Laminated Glass

The obtained interlayer film for a laminated glass was sandwiched between two clear glass sheets (30 cm long×30 cm wide×2.5 mm thick) conforming to JIS R3202(1996), and a portion protruding therefrom was cut, whereby a laminated glass structure was prepared. The obtained laminated glass structure was placed into a rubber bag, which was connected to a vacuum suction device. The rubber bag was held under a reduced pressure of −60 kPa (absolute pressure of 16 kPa) for 10 minutes with heating so that the temperature (preliminary pressure-bonding temperature) of the laminated glass structure reached 70° C. Thereafter, the pressure was returned to atmospheric pressure to complete the preliminary pressure-bonding. The preliminarily pressure-bonded laminated glass structure was placed in an autoclave, and held at a temperature of 140° C. and a pressure of 1300 kPa for 10 minutes. Then, the temperature was lowered to 50° C. and the pressure was returned to atmospheric pressure, whereby the final pressure-bonding was completed. A laminated glass was thus prepared.

(6) Measurement for Projections and Recesses on Interface

The obtained laminated glass was cooled with liquid nitrogen, so that the interlayer film for a laminated glass was peeled away from the glass. The peeled interlayer film for a laminated glass was cut into a size of 5 cm long×5 cm wide and allowed to stand at a temperature of 25° C. and a humidity of 30% for two hours.

A finger was put between the layers A and B, and the layer A was held with one hand and the layer B with the other hand. The layers were then peeled away from each other with both hands at 1 to 2 cm/s. The layer A after peeling was allowed to stand for two hours at a temperature of 25° C. and a humidity of 30%. Thereafter, the surface of the peeled layer A on the side of the layer B was subjected to the measurement of the ten-point average roughness Rz and the average interval Sm of projections and recesses after the production of the laminated glass in conformity with JIS B 0601(1994) using a high-accuracy profile measurement system (produced by Keyence Corporation, "KS-1100", model number of head: LT-9510VM). The measurement conditions were as follows: the stage travel rate: 1000 μm/s, the measurement pitch of X-axis: 10 μm, the measurement pitch of Y-axis: 10 μm, and the measuring field: 2.5 cm along the machine direction in the production of the interlayer film for a laminated glass by 1 cm along the direction perpendicular to the machine direction. The obtained data was analyzed with analysis software KS-Analyzer (produced by Keyence Corporation). The line roughness (1994JIS) was measured with the analyzing software using a horizontal line after height smoothing correction (cut-off value: 2.50 mm, simple average: ±12). Each of the Rz and the Sm was measured as the average of three randomly selected points spaced by at least 1 mm in the perpendicular direction of the image. The layer B and the layer C were peeled away from each other in the same manner, and the ten-point average roughness Rz and the average interval Sm of projections and recesses of the surface of the layer C on the side of the layer B were measured. The projections and recesses on the interface before the production of the laminated glass were also measured in the same manner, except that the step of cooling the laminated glass with liquid nitrogen was omitted.

(7) Measurement of Plasticizer Content

The laminated glass produced above was allowed to stand for four weeks at a temperature of 25° C. and a humidity of 30%. The laminated glass was then cooled with liquid nitrogen, so that the interlayer film for a laminated glass was peeled away from the glass. The obtained protective layers and the intermediate layer were cut in the thickness direction, followed by standing for two hours at a temperature of 25° C. and a humidity of 30%. Thereafter, a finger or apparatus was put between one of the protective layers and the intermediate layer, and the layers were peeled away from each other at a temperature of 25° C. and a humidity of 30%. Thus, 10 g of a rectangular specimen was obtained for each of the protective layer and the intermediate layer. The specimens were each subjected to extraction of the plasticizer for 12 hours using a Soxhlet extractor with diethyl ether. The amount of the plasticizer in each specimen was determined to determine the plasticizer content of each of the protective layer and the intermediate layer.

EXAMPLE 2

An interlayer film for a laminated glass and a laminated glass were prepared and projections and recesses on the interface were subjected to measurement in the same manner as in Example 1, except that the variation range of the inlet pressure of each extruder within 30 seconds was controlled to 0.2% or less.

EXAMPLE 3

An interlayer film for a laminated glass and a laminated glass were prepared and projections and recesses on the interface were subjected to measurement in the same manner as in Example 1, except that the second step was omitted.

EXAMPLE 4

An interlayer film for a laminated glass and a laminated glass were prepared in the same manner as in Example 1, except that the variation range of the inlet pressure of each extruder within 30 seconds was controlled to 0.4% or less and that the linear pressure in the first step in the impartment of projections and recesses was changed to 5 to 49.9 kN/m.

EXAMPLE 5

An interlayer film for a laminated glass and a laminated glass were prepared and projections and recesses on the interface were subjected to measurement in the same manner as in Example 4, except that the variation range of the inlet pressure of each extruder within 30 seconds was controlled to 0.2% or less.

EXAMPLE 6

The resin compositions were extruded in the same manner as in Example 2 except for the following changes: The co-extrusion with a co-extruder was performed using a die whose lip had a shape for a lip method, and the lip die had a lip gap of 0.7 to 1.4 mm; the temperature of the resin compositions at the inlet of the die was adjusted to 150° C. to 270° C. and the temperature of the lip die was adjusted to 210° C.; the line speed was 10 m/min; and the variation range of the inlet pressure of each extruder within 30 seconds was controlled to 0.4% or less. An interlayer film for a laminated glass and a laminated glass were prepared and projections and recesses on the interface were subjected to measurement in the same manner as in Example 2 except that the first step of the impartment of projections and recesses was omitted.

EXAMPLE 7

An interlayer film for a laminated glass and a laminated glass were prepared and projections and recesses were subjected to measurement in the same manner as in Example 6, except that the step 2 was omitted.

EXAMPLE 8

The interlayer film for a laminated glass of Example 4 was heated in a gear oven such that the film surface temperature reached 120° C., and stretched at 5 cm to 15 cm/s to 1.3 times the length before the heating. The film was fixed with jigs to maintain the 1.3-times stretch and then cooled with 25° C. water. The cooled film, while being fixed, was allowed to stand for 12 hours at a temperature of 25° C. and a humidity of 30%, so that the film was dried. After the drying, a laminated glass was prepared and projections and recesses on the interface were subjected to measurement in the same manner as in Example 1.

EXAMPLE 9

A laminated glass was prepared and projections and recesses on the interface were subjected to measurement in the same manner as in Example 8, except that the interlayer film for a laminated glass of Example 7 was used instead of the interlayer film for a laminated glass of Example 4.

EXAMPLE 10

The interlayer film for a laminated glass of Example 3 was heated in a gear oven such that the film surface temperature reached 120° C., and stretched at 5 cm to 15 cm/s to 1.3 times the length before the heating. The film was fixed with jigs to maintain the 1.3-times stretch and then cooled with 25° C. water. The cooled film, while being fixed, was allowed to stand for 12 hours at a temperature of 25° C. and a humidity of 30%, so that the film was dried. After the drying, a laminated glass was prepared and projections and recesses on the interface were subjected to measurement in the same manner as in Example 1.

EXAMPLES 11 AND 12

An interlayer film for a laminated glass and a laminated glass were prepared and projections and recesses were subjected to measurement in the same manner as in Example 3, except that the acetyl group content, the butyral group content, and the hydroxy group content of the polyvinyl butyral used for the intermediate layer were changed.

EXAMPLES 13 AND 14

An interlayer film for a laminated glass and a laminated glass were prepared and projections and recesses were subjected to measurement in the same manner as in Example 6, except that the acetyl group content, the butyral group content, and the hydroxy group content of the polyvinyl butyrals used for the protective layer and the intermediate layer were changed, and that the metal roll used in the step 2 having a surface milled with a triangular oblique line-type mill was changed.

EXAMPLES 15 AND 16

An interlayer film for a laminated glass and a laminated glass were prepared and projections and recesses were subjected to measurement in the same manner as in Example 6, except that the acetyl group content, the butyral group content, and the hydroxy group content of the polyvinyl butyrals used for the protective layer and the intermediate layer were changed, and that the temperature of the lip die was adjusted to 195° C. to 209° C.

COMPARATIVE EXAMPLE 1

An interlayer film for a laminated glass and a laminated glass were prepared and projections and recesses were subjected to measurement in the same manner as in Example 1, except that the variation in the inlet pressure was not controlled during the co-extrusion with a co-extruder.

Measurement with the pressure measuring device installed at the inlet of each gear pump showed that the variation range of the inlet pressure of each extruder within 30 seconds was 1.0% or more.

COMPARATIVE EXAMPLE 2

An interlayer film for a laminated glass and a laminated glass were prepared and projections and recesses were subjected to measurement in the same manner as in Example 1, except that the variation range of the inlet pressure of each extruder within 30 seconds was controlled to 0.8% or less.

COMPARATIVE EXAMPLE 3

An interlayer film for a laminated glass and a laminated glass were prepared and projections and recesses were subjected to measurement in the same manner as in Example 6, except that the temperature of the resin compositions at the inlet of the die was changed to 100° C. to 145° C., and that the variation in the inlet pressure was not controlled. Measurement with the pressure measuring device installed at the inlet of each gear pump showed that the variation range of the inlet pressure of each extruder within 30 seconds was 1.0% or more.

(Evaluation)

The laminated glasses obtained in the examples and comparative examples were subjected to evaluation of the occurrence of optical distortion in the following manner. The results are shown in Tables 1 and 2.

In Tables 1 and 2, regarding the polyvinyl butyrals used in the examples and comparative examples, the acetyl group content was abbreviated as Ac, the butyral group content was abbreviated as Bu, and the hydroxy group content was abbreviated as OH.

(1) Evaluation of Optical Distortion (Visual Evaluation)

A fluorescent lamp (FL32S.D, Panasonic Corporation) was set at a position 7 m away from the observer. The obtained laminated glass was placed at a position on a straight line connecting the fluorescent lamp and the observer and 40 cm distant from the observer such that the laminated glass was inclined at an angle of 20° to a horizontal plane. A rating "× (Poor)" was given when the fluorescent lamp appeared distorted through the laminated glass. A rating "○ (Good)" was given when the fluorescent lamp did not appear distorted.

The optical distortion was evaluated at 25° C. and 80° C.

(2) Evaluation of Optical Distortion Value

The optical distortion value was determined using an optical distortion inspecting device disclosed in JP H07-306152 A. The device includes: a light source unit which emits illumination light toward a light-transmitting object to be inspected; a projection plane where the illumination light having passed through the object to be inspected is projected; an image inputting portion for generating a grayscale image by capturing the projection plane; and an image processing portion for determining the presence or absence of distortion based on the variation in the gray level of the grayscale image generated by the image inputting portion. Specifically, upon evaluation on the optical distortion by using EYE DICHO-COOL HALOGEN (15 V 100 W) produced by Iwasaki Electric Co., Ltd. as a light source, the illuminance of the light source, the angle of the screen where an optical distortion image is projected, and the angle of the camera were adjusted in such a manner that a laminated glass including a single layer film having a visible light transmittance in conformity with JIS R 3211(1988) (value for Y under standard illuminant A, A-Y (380 to 780 nm)) of 88% ("U4100" produced by Hitachi High-Technologies Corporation was used) had an optical distortion value of 1.14 and that the optical distortion value in a state of including no glass was adjusted to 1.30. The optical distortion was evaluated using a laminated glass prepared such that the above visible light transmittance was 87% to 89% under the conditions of a measurement atmosphere temperature of 23° C. and a laminated glass temperature of 25° C. and 80° C. The evaluation was performed 24 hours after the autoclave treatment. As the optical distortion values, values in the lengthwise direction and in the width direction can be calculated. In the present case, the smaller value of the two was employed as the optical distortion value. The thermometer used was a contact-type thermometer.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Surface embossing method | | | Roll embossing method | Roll embossing method | Roll embossing method | Roll embossing method | Roll embossing method | Lip embossing method | Lip embossing method | Roll embossing method | Lip embossing method | Roll embossing method |
| Stretch | | | 100% | 100% | 100% | 100% | 100% | 100% | 100% | 130% | 130% | 130% |
| Variation range of inlet pressure in co-extrusion (%) | | | 0.4 | 0.2 | 0.4 | 0.4 | 0.2 | 0.4 | 0.4 | 0.4 | 0.4 | 0.4 |
| Resin composition For protective layer | Bu | mol % | 69.0 | 69.0 | 69.0 | 69.0 | 69.0 | 69.0 | 69.0 | 69.0 | 69.0 | 69.0 |
| | OH | mol % | 30.0 | 30.0 | 30.0 | 30.0 | 30.0 | 30.0 | 30.0 | 30.0 | 30.0 | 30.0 |
| | Ac | mol % | 1.0 | 1.0 | 1.0 | 1.0 | 1.0 | 1.0 | 1.0 | 1.0 | 1.0 | 1.0 |
| Plasticizer content (parts) after glass production | | phr | 37 | 37 | 37 | 37 | 37 | 37 | 37 | 37 | 37 | 37 |
| Resin composition for intermediate layer | Bu | mol % | 65.0 | 65.0 | 65.0 | 65.0 | 65.0 | 65.0 | 65.0 | 65.0 | 65.0 | 65.0 |
| | OH | mol % | 23.0 | 23.0 | 23.0 | 23.0 | 23.0 | 23.0 | 23.0 | 23.0 | 23.0 | 23.0 |
| | Ac | mol % | 12.0 | 12.0 | 12.0 | 12.0 | 12.0 | 12.0 | 12.0 | 12.0 | 12.0 | 12.0 |
| Plasticizer content (parts) after glass production | | phr | 70 | 70 | 70 | 70 | 70 | 70 | 70 | 70 | 70 | 70 |
| Projections and recesses on protective layer surface | Ten-point average roughness Rz (μm) | | 50 | 47 | 35 | 33 | 33 | 35 | 20 | 29 | 14 | 22 |
| Projections and recesses on layer B-side surface of layer A peeled before laminated glass production | Ten-point average roughness Rz (μm) | | 1.12 | 0.89 | 1.05 | 0.67 | 0.59 | 0.88 | 0.69 | 0.71 | 1.10 | 1.20 |
| | Average interval of projections and recesses Sm (μm) | | 1599 | 1195 | 1299 | 1325 | 875 | 1451 | 1198 | 987 | 1059 | 1150 |
| | Rz/Sm | | 0.00070 | 0.00074 | 0.00081 | 0.00051 | 0.00067 | 0.00061 | 0.00058 | 0.00072 | 0.00104 | 0.00104 |
| Projections and recesses on layer B-side surface of layer A peeled after laminated glass production | Ten-point average roughness Rz (μm) | | 1.77 | 0.92 | 1.32 | 0.68 | 0.6 | 1.40 | 0.84 | 0.79 | 1.37 | 1.85 |
| | Average interval of projections and recesses Sm (μm) | | 1230 | 921 | 819 | 692 | 632 | 1364 | 871 | 782 | 895 | 1057 |
| | Rz/Sm | | 0.00146 | 0.00100 | 0.00164 | 0.00098 | 0.00095 | 0.00102 | 0.00105 | 0.00108 | 0.00162 | 0.00175 |
| Evaluation | Optical distortion evaluation (visual evaluation) | 25° C. | ○ | ○ | ○ | ○ | ○ | ○ | ○ | ○ | ○ | ○ |
| | | 80° C. | ○ | ○ | ○ | ○ | ○ | ○ | ○ | ○ | ○ | ○ |
| | Optical distortion value | 25° C. | 1.8 | 1.35 | 1.66 | 1.25 | 1.21 | 1.3 | 1.28 | 1.3 | 1.4 | 2.16 |
| | | 80° C. | 1.93 | 1.38 | 1.75 | 1.26 | 1.22 | 1.32 | 1.3 | 1.33 | 1.45 | 2.35 |

TABLE 2

| | | Example 11 Roll embossing method | Example 12 Roll embossing method | Example 13 Lip embossing method | Example 14 Lip embossing method | Example 15 Lip embossing method | Example 16 Lip embossing method | Comparative Example 1 Roll embossing method | Comparative Example 2 Roll embossing method | Comparative Example 3 Lip embossing method |
|---|---|---|---|---|---|---|---|---|---|---|
| Surface embossing method | | | | | | | | | | |
| Stretch | | 100% | 100% | 100% | 100% | 100% | 100% | 100% | 100% | 100% |
| Variation range of the inlet pressure in co-extrusion (%) | | 0.4 | 0.4 | 0.4 | 0.4 | 0.4 | 0.4 | 1.0 | 0.8 | 1.0 |
| Resin composition for protective layer | Bu mol % | 69.0 | 69.0 | 69.8 | 66.4 | 70.4 | 66.4 | 69.0 | 69.0 | 69.0 |
| | OH mol % | 30.0 | 30.0 | 29.1 | 32.5 | 28.6 | 32.5 | 30.0 | 30.0 | 30.0 |
| | Ac mol % | 1.0 | 1.0 | 1.1 | 1.1 | 1.0 | 1.1 | 1.0 | 1.0 | 1.0 |
| | Plasticizer content (parts) phr | 37 | 37 | 37 | 37 | 37 | 37 | 37 | 37 | 37 |
| Resin composition for intermediate layer | Bu mol % | 57.0 | 67.5 | 80.6 | 68.1 | 80.3 | 68.1 | 65.0 | 65.0 | 65.0 |
| | OH mol % | 20.0 | 20.5 | 18.8 | 24.3 | 18.6 | 24.3 | 23.0 | 23.0 | 23.0 |
| | Ac mol % | 23.0 | 12.0 | 0.6 | 7.6 | 1.1 | 7.6 | 12.0 | 12.0 | 12.0 |
| | Plasticizer content (parts) after glass production phr | 72 | 72 | 70 | 70 | 70 | 70 | 70 | 70 | 70 |
| Projections and recesses on protective layer surface | Ten-point average roughness Rz (μm) | 35 | 35 | 60 | 25 | 50 | 45 | 50 | 50 | 35 |
| Projections and recesses on layer B-side surface of layer A peeled before laminated glass production | Ten-point average roughness Rz (μm) | 1.03 | 0.98 | 1.20 | 0.67 | 1.45 | 1.15 | 1.45 | 1.30 | 1.97 |
| | Average interval of projections and recesses Sm (μm) | 1175 | 1229 | 1842 | 1217 | 2625 | 1256 | 1268 | 1138 | 1625 |
| | Rz/Sm | 0.00088 | 0.00080 | 0.00065 | 0.00055 | 0.00055 | 0.00092 | 0.00114 | 0.00114 | 0.00121 |
| Projections and recesses on layer B-side surface of layer A peeled after laminated glass production | Ten-point average roughness Rz (μm) | 1.20 | 1.17 | 1.70 | 0.87 | 1.65 | 1.57 | 2.54 | 1.97 | 4.46 |
| | Average interval of projections and recesses Sm (μm) | 850 | 825 | 1674 | 871 | 1950 | 1047 | 1312 | 1037 | 1402 |
| | Rz/Sm | 0.00141 | 0.00142 | 0.00102 | 0.00100 | 0.00085 | 0.00150 | 0.00215 | 0.00190 | 0.00318 |
| Evaluation | Optical distortion evaluation (visual evaluation) 25° C. | ○ | ○ | ○ | ○ | ○ | ○ | ○ | ○ | ○ |
| | 80° C. | ○ | ○ | ○ | ○ | ○ | ○ | × | × | × |
| | Optical distortion value 25° C. | 1.65 | 1.58 | 1.55 | 1.25 | 1.35 | 1.7 | 3.35 | 2.54 | 2.51 |
| | 80° C. | 1.9 | 1.81 | 1.7 | 1.31 | 1.4 | 1.81 | 3.94 | 2.95 | 2.93 |

INDUSTRIAL APPLICABILITY

The present invention provides an interlayer film for a laminated glass which has a multilayer structure including two or more resin layers laminated together and can prevent optical distortion even at high temperatures. The present invention also provides a laminated glass including the interlayer film for a laminated glass and a method of producing the interlayer film for a laminated glass.

REFERENCE SIGNS LIST

1 Clear glass
10 Resin layer
20 Resin layer
21 Surface of resin layer 20 on the side having been in contact with resin layer 10
30 Resin layer
40 Vehicle
41 Laminated glass
42 Hood
43 Area where Rz/Sm according to the present invention should be satisfied

The invention claimed is:

1. An interlayer film for a laminated glass, the interlayer film comprising:
    two or more resin layers laminated together including one resin layer and another resin layer that is in direct contact with the one resin layer,
    the one resin layer, before production of a laminated glass, having a surface with an average interval Sm (μm) of projections and recesses of 300 μm or more, and a ratio (Rz/Sm) of a ten-point average roughness Rz (μm) to the average interval Sm (μm) of projections and recesses of 0.00110 or less as measured in conformity with JIS B-0601(1994) in the following manner:
    the one resin layer is peeled away from the other resin layer; and the Rz and Sm of the surface of the one resin layer on the side having been in contact with the other resin layer are measured.

2. The interlayer film for a laminated glass according to claim 1,
    wherein the average interval Sm of projections and recesses of the surface of the one resin layer is 632 μm or more.

3. The interlayer film for a laminated glass according to claim 1,
    wherein the ten-point average roughness Rz of the surface of the one resin layer is 2.0 μm or less as measured in conformity with JIS B-0601(1994) in the following manner:
    the one resin layer is peeled away from the other resin layer; and the Rz of the surface of the one resin layer on the side having been in contact with the other resin layer is measured.

4. The interlayer film for a laminated glass according to claim 1,
    wherein a difference in refractive index between the two or more resin layers is 0.03 or less.

5. The interlayer film for a laminated glass according to claim 1,
    wherein the one resin layer contains a thermoplastic resin, and
    the other resin layer that is in direct contact with the one resin layer contains a thermoplastic resin that is different from the thermoplastic resin contained in the one resin layer.

6. The interlayer film for a laminated glass according to claim 1, having a plurality of recesses on at least one surface thereof,
    wherein the ten-point average roughness Rz of the at least one surface with the plurality of recesses is 10 to 60 μm as measured in conformity with JIS B-0601(1994).

7. The interlayer film for a laminated glass according to claim 1, which is used for a vehicle.

8. A laminated glass, comprising:
    a pair of glass sheets; and
    the interlayer film for a laminated glass according to claim 1 between the glass sheets.

* * * * *